US012263684B2

(12) United States Patent
Furukawa et al.

(10) Patent No.: US 12,263,684 B2
(45) Date of Patent: Apr. 1, 2025

(54) INK-REPLACEMENT METHOD FOR INKJET RECORDING APPARATUS

(71) Applicant: KYOCERA Document Solutions Inc., Osaka (JP)

(72) Inventors: Noriaki Furukawa, Osaka (JP); Takashi Somete, Osaka (JP); Takuma Araki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 159 days.

(21) Appl. No.: 18/185,841

(22) Filed: Mar. 17, 2023

(65) Prior Publication Data

US 2023/0302815 A1 Sep. 28, 2023

(30) Foreign Application Priority Data

Mar. 24, 2022 (JP) ................................ 2022-049054

(51) Int. Cl.
*B41J 2/19* (2006.01)
*B41J 2/165* (2006.01)
*B41J 2/175* (2006.01)
*B41J 2/185* (2006.01)

(52) U.S. Cl.
CPC ........... *B41J 2/185* (2013.01); *B41J 2/16526* (2013.01); *B41J 2/175* (2013.01); *B41J 2/19* (2013.01); *B41J 2002/1853* (2013.01); *B41J 2002/1856* (2013.01); *B41J 2202/12* (2013.01)

(58) Field of Classification Search
CPC ........ B41J 2/185; B41J 2/16526; B41J 2/175; B41J 2/19; B41J 2002/1853; B41J 2002/1856; B41J 2202/12
See application file for complete search history.

(56) References Cited

FOREIGN PATENT DOCUMENTS

| | | | | |
|---|---|---|---|---|
| JP | 2004327541 A | * 11/2004 | ......... H01L 51/0004 |
| JP | 2009-269277 A | 11/2009 | |
| JP | 2017177489 A | * 10/2017 | .............. B41J 2/165 |
| JP | 2021104642 A | * 7/2021 | .............. B41J 2/175 |

* cited by examiner

*Primary Examiner* — Yaovi M Ameh
(74) *Attorney, Agent, or Firm* — Stein IP, LLC

(57) ABSTRACT

Provided is an ink-replacement method for an inkjet recording apparatus that includes a recording head having an ink ejection surface on which a plurality of nozzles for ejecting ink onto a recording medium is arranged, a sub-tank for temporarily retaining the ink supplied from an ink container, and an ink flow path along which the ink circulates from and to the sub-tank by passing through the recording head. In replacing a first ink present in the ink flow path with a second ink to be newly supplied to the recording head via the ink flow path, when the second ink is caused to flow from the sub-tank into the ink flow path, pulsation is generated in the ink flow path.

5 Claims, 7 Drawing Sheets

INK-REPLACEMENT METHOD FOR INKJET RECORDING APPARATUS

INCORPORATION BY REFERENCE

This application is based upon and claims the benefit of priority from the corresponding Japanese Patent Application No. 2022-049054 (filed on Mar. 24, 2022), the entire contents of which are incorporated herein by reference.

BACKGROUND

The present disclosure relates to an ink-replacement method for an inkjet recording apparatus.

An inkjet recording apparatus includes a recording head that ejects ink onto a recording medium such as a sheet of paper so as to record an image on the recording medium. With regard to such an inkjet recording apparatus, there has been proposed an ink-replacement method for efficiently replacing ink present in an ink flow path with a new different supply of ink.

SUMMARY

An ink-replacement method for an inkjet recording apparatus according to an aspect of the present disclosure is an ink-replacement method for an inkjet recording apparatus that includes a recording head having an ink ejection surface on which a plurality of nozzles for ejecting ink onto a recording medium is arranged, a sub-tank for temporarily retaining the ink supplied from an ink container, and an ink flow path along which the ink circulates from and to the sub-tank by passing through the recording head. In the method, in replacing a first ink present in the ink flow path with a second ink to be newly supplied to the recording head via the ink flow path, when the second ink is caused to flow from the sub-tank into the ink flow path, pulsation is generated in the ink flow path.

DETAILED DESCRIPTION

With reference to the appended drawings, the following describes embodiments of the present disclosure. The present disclosure is not limited to the following description.

Figure 1:
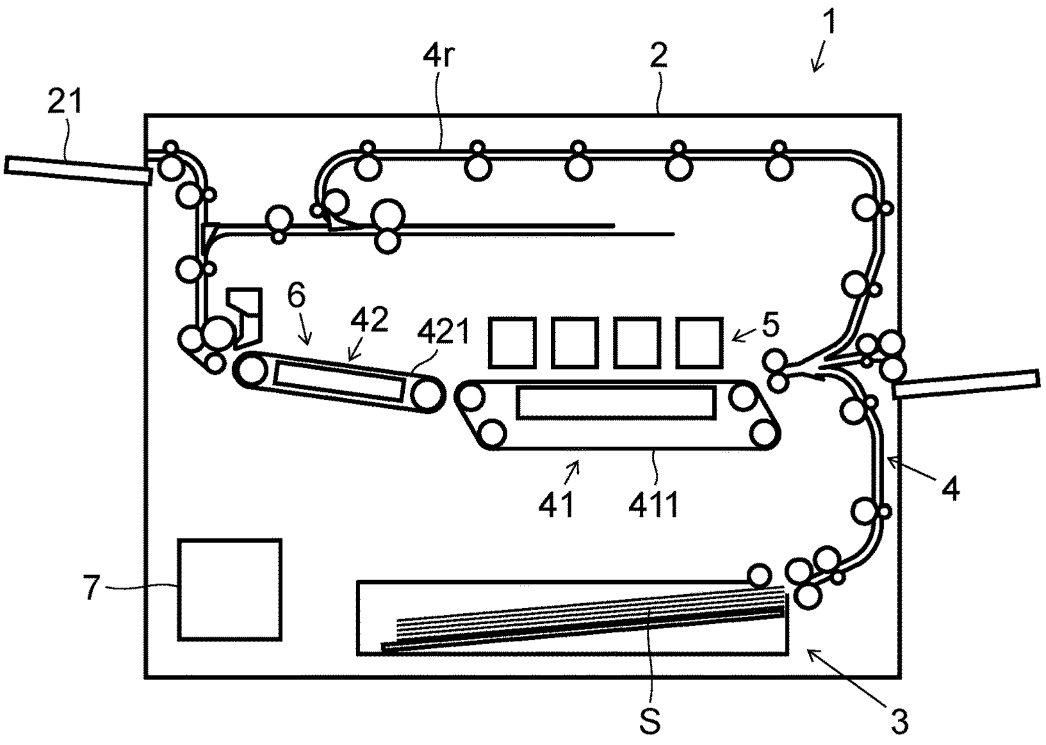
FIG. 1 is a schematic sectional front view of an inkjet recording apparatus according to an embodiment of the present disclosure.
Figure 2:
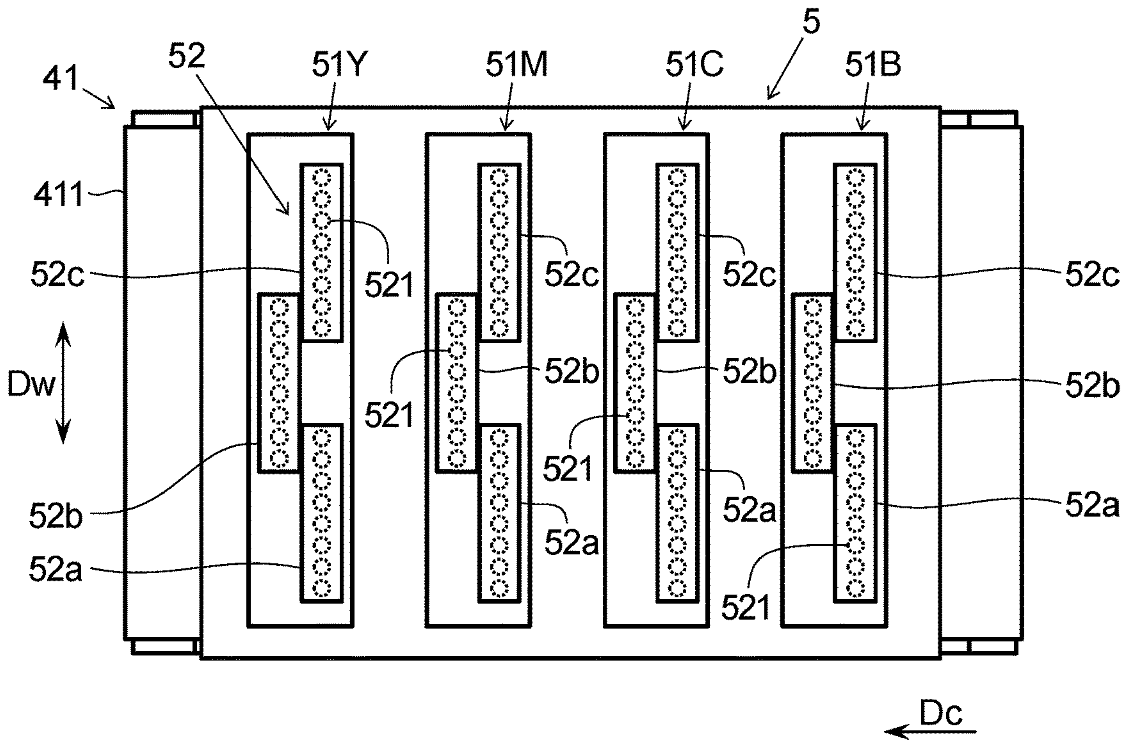
FIG. 2 is a plan view of a vicinity of a recording portion in the inkjet recording apparatus shown in FIG. 1.

FIG. 1 is a schematic sectional front view of an inkjet recording apparatus 1 according to an embodiment. FIG. 2 is a plan view of a vicinity of a recording portion 5 in the inkjet recording apparatus 1 shown in FIG. 1. The inkjet recording apparatus 1 is, for example, a printer of an inkjet recording type. As shown in FIG. 1 and FIG. 2, the inkjet recording apparatus 1 includes an apparatus main body 2, a sheet feed portion 3, a sheet conveyance portion 4, the recording portion 5, a drying portion 6, and a control portion 7.

The sheet feed portion 3 is arranged, for example, at a lower part in the apparatus main body 2. The sheet feed portion 3 contains a plurality of sheets (recording media) S and feeds out the sheets S one by one separately during recording.

The sheet conveyance portion 4 is arranged on a downstream side of the sheet feed portion 3 in a sheet conveyance direction and conveys the sheet S fed out from the sheet feed portion 3. The sheet conveyance portion 4 conveys the sheet S to the recording portion 5 and to the drying portion 6 and further discharges the sheet S after being subjected to recording and drying to a sheet discharge portion 21. The sheet conveyance portion 4 includes, for example, a reverse conveyance part **4*r*. In a case where double-sided recording is performed, the sheet conveyance portion 4 distributes the sheet S after being subjected to recording on its first side and drying to the reverse conveyance part 4*r* and further switches the conveyance direction so that the sheet S with its front and back sides reversed is conveyed again to the recording portion 5 and to the drying portion 6**.

The sheet conveyance portion 4 includes a first belt conveyance part 41 and a second belt conveyance part 42. The first belt conveyance part 41 includes a first conveyance belt 411 formed to be endless. The second belt conveyance part 42 includes a second conveyance belt 421 formed to be endless. Each of the first belt conveyance part 41 and the second belt conveyance part 42 conveys the sheet S while holding the sheet S by absorption on an upper outer surface (upper surface) of a corresponding one of the first conveyance belt 411 and the second conveyance belt 421. The first belt conveyance part 41 is arranged below the recording portion 5 to convey the sheet S. The second belt conveyance part 42 is positioned on a downstream side with respect to the first belt conveyance part 41 in the sheet conveyance direction and is arranged in the drying portion 6 to convey the sheet S.

The recording portion 5 is positioned on a downstream side of the sheet feed portion 3 in the sheet conveyance direction and is arranged to be opposed to the first belt conveyance part 41. The recording portion 5 is opposed to the sheet S being conveyed while being held by absorption on the upper surface of the first conveyance belt 411 and is arranged above the first conveyance belt 411 at a prescribed distance therefrom. That is, the recording portion 5 is opposed to the sheet S being conveyed by the sheet conveyance portion 4.

As shown in FIG. 2, the recording portion 5 holds head units 51B, 51C, 51M, and 51Y corresponding to four different colors of black, cyan, magenta, and yellow, respectively. The head units 51B, 51C, 51M, and 51Y are arranged in juxtaposition along a sheet conveyance direction Dc so that a longitudinal direction thereof is parallel to a sheet width direction Dw orthogonal to the sheet conveyance direction Dc. Since the four head units 51B, 51C, 51M, and 51Y are identical in basic configuration, in the following description, identification symbols "B," "C," "M," and "Y" representing the respective colors may be omitted unless required to be particularly limited.

Each of the head units 51 of the respective colors includes a recording head 52 employing a line-type inkjet system. In each of the head units 51 of the respective colors, a plurality of (for example, three (52*a*, 52*b*, and 52*c*)) recording heads 52 is arrayed in a staggered manner along the sheet width direction Dw.

Each of the recording heads 52 includes a plurality of ink ejection nozzles 521 provided at a bottom thereof. The plurality of ink ejection nozzles 521 is arranged in juxtaposition along the sheet width direction Dw and is capable of ejecting ink over an entire recording region on the sheet S. That is, each of the recording heads 52 has an ink ejection surface on which the plurality of ink ejection nozzles 521 for ejecting ink onto the sheet S is arranged. The recording portion 5 ejects ink sequentially from the recording heads 52 of each of the head units 51B, 51C, 51M, and 51Y of the four different colors toward the sheet S being conveyed by the first conveyance belt 411 so as to record a full-color image or a monochrome image on the sheet S.

The drying portion 6 is arranged on a downstream side with respect to the recording portion 5 in the sheet conveyance direction, and the second belt conveyance part 42 is provided therein. Ink on the sheet S on which an ink image has been recorded in the recording portion 5 is dried as the sheet S is conveyed while being held by absorption on the second conveyance belt 421 in the drying portion 6.

The control portion 7 includes a CPU, a storage part, and other electronic circuits and electronic components (none of which are shown). Based on control programs or data stored in the storage part, the CPU controls operations of the various constituent elements provided in the inkjet recording apparatus 1 so as to perform processes related to functions of the inkjet recording apparatus 1. Upon individually receiving instructions from the control portion 7, the sheet feed portion 3, the sheet conveyance portion 4, the recording portion 5, and the drying portion 6 perform recording on the sheet S in tandem with one another. The storage part is composed of, for example, a combination of a non-volatile storage device such as a program ROM (read-only memory) or a data ROM and a volatile storage device such as a RAM (random-access memory).

First Embodiment

Figure 3:
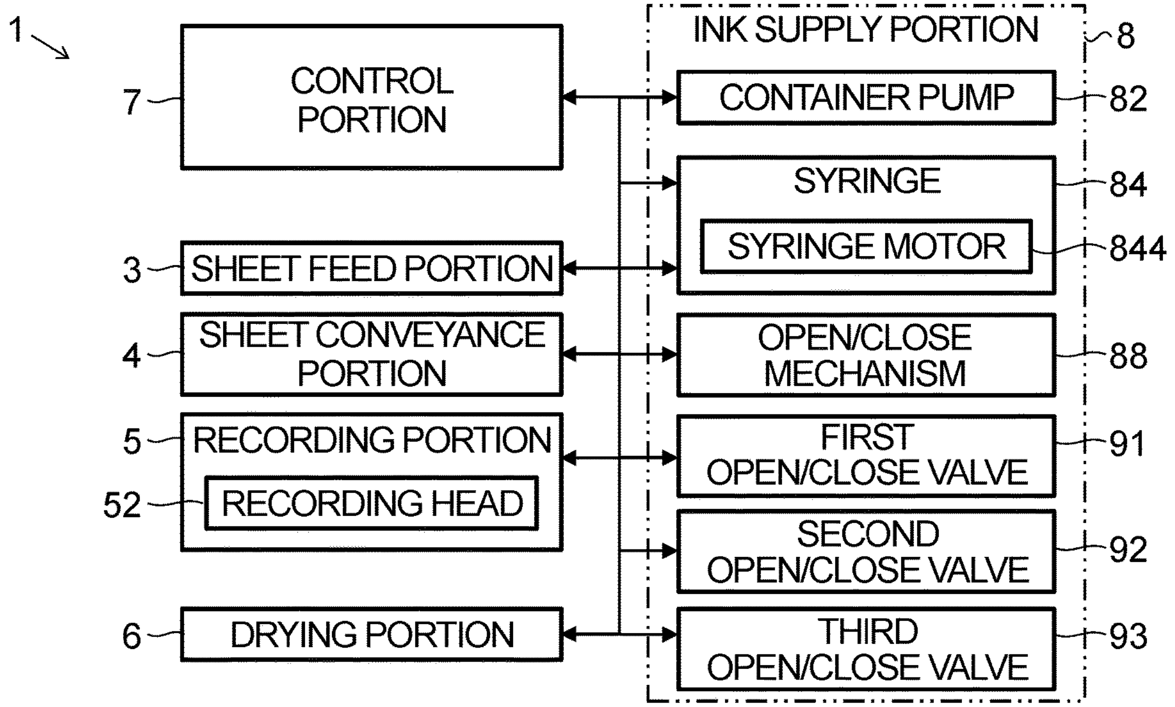
FIG. 3 is a block diagram of an inkjet recording apparatus according to a first embodiment of the present disclosure.
Figure 4:
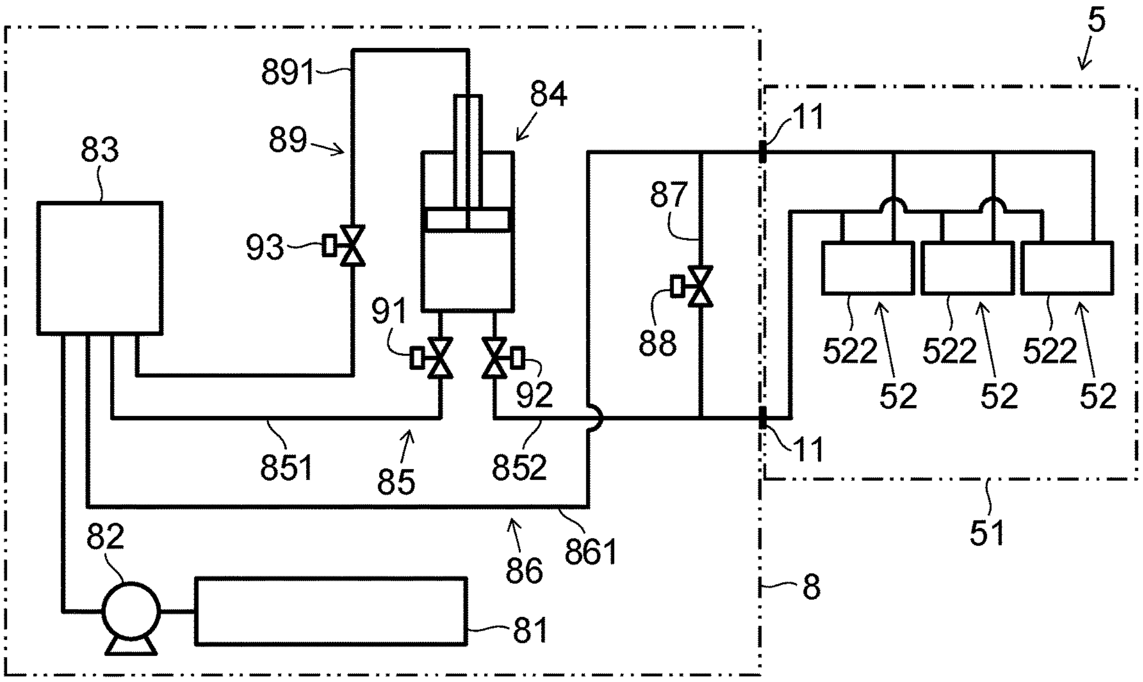
FIG. 4 is an explanatory view of a vicinity of an ink supply portion in the inkjet recording apparatus shown in FIG. 3.
Figure 5:
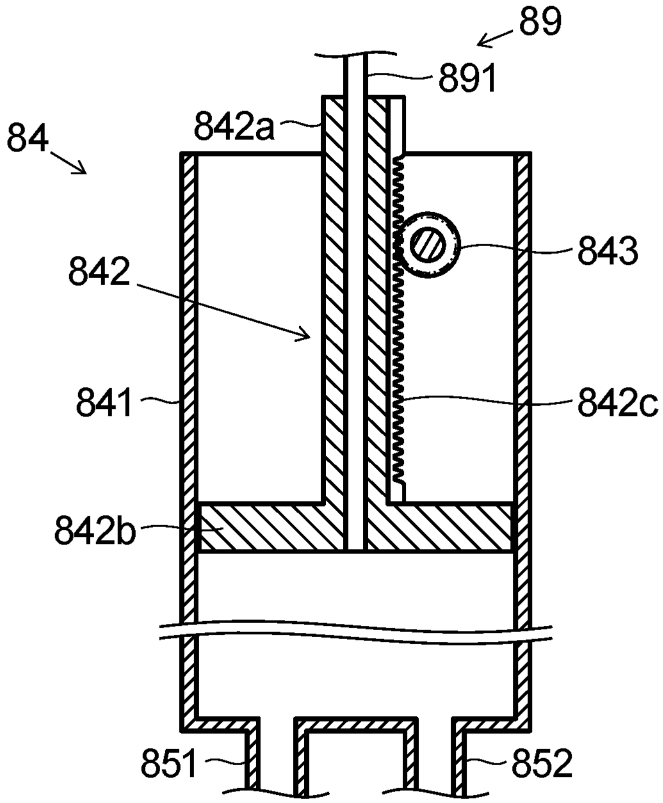
FIG. 5 is a sectional view of a syringe in the ink supply portion shown in FIG. 4.
Figure 6:
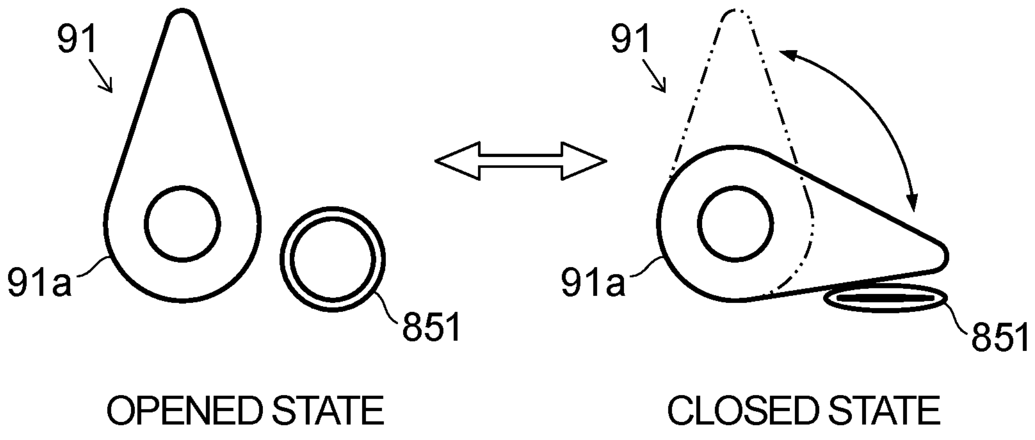
FIG. 6 is an explanatory view of an open/close valve of the ink supply portion shown in FIG. 4.

Next, with reference to FIG. 3 to FIG. 6, a description is given of a configuration of an ink supply portion 8 of an inkjet recording apparatus 1 according to a first embodiment. FIG. 3 is a block diagram of the inkjet recording apparatus 1 according to the first embodiment of the present disclosure. FIG. 4 is an explanatory view of a vicinity of the ink supply portion 8 in the inkjet recording apparatus 1 shown in FIG. 3. FIG. 5 is a sectional view of a syringe 84 in the ink supply portion 8 shown in FIG. 4. FIG. 6 is an explanatory view of an open/close valve of the ink supply portion 8 shown in FIG. 4.

The inkjet recording apparatus 1 according to the first embodiment includes the ink supply portion 8. The ink supply portion 8 is provided individually for each of head units 51 of four different colors. In the following description, identification symbols representing the respective colors are omitted. The ink supply portion 8 is coupled to each of the head units 51 by using a detachable coupling 11. The coupling 11 includes a built-in valve member (not shown) that opens an ink flow path when in a connected state and closes the ink flow path when in a disconnected state.

The ink supply portion 8 includes an ink container 81, a container pump 82, a sub-tank 83, the syringe 84, a first flow path 85, a second flow path 86, a communication flow path 87, and an open/close mechanism 88. The ink supply portion 8 further includes a third flow path 89, a first open/close valve 91, a second open/close valve 92, and a third open/close valve 93.

The ink container 81 is provided in an apparatus main body 2 so as to be detachable therefrom. The ink container 81 contains ink to be supplied to recording heads 52.

The container pump 82 is arranged on a downstream side of the ink container 81 in an ink flow direction. The container pump 82 sucks the ink in the ink container 81 and ejects the ink toward the sub-tank 83. An operation of the container pump 82 is controlled by a control portion 7.

The sub-tank 83 is arranged on a downstream side of the container pump 82 in the ink flow direction. The sub-tank 83 temporarily retains ink supplied from the ink container 81. The sub-tank 83 is provided with an ink amount sensor (not shown). The ink amount sensor includes a sensor of, for example, an optical, capacitance, electrode, differential pressure, or float type and detects an amount of the ink in the sub-tank 83.

The control portion 7 receives a detection signal from the ink amount sensor in the sub-tank 83. When the amount of the ink in the sub-tank 83 detected by the ink amount sensor becomes lower than a prescribed amount, the control portion 7 controls the container pump 82 to supply ink from the ink container 81 to the sub-tank 83. An amount of the ink supplied from the ink container 81 to the sub-tank 83 is controlled by, for example, changing a driving duration of the container pump 82. In a case where the amount of the ink in the sub-tank 83 detected by the ink amount sensor does not become higher than the prescribed amount even after a lapse of a given driving duration of the container pump 82, the control portion 7 determines that an amount of the ink in the ink container 81 is nil.

The sub-tank 83 and the recording heads 52 are arranged with a positional relationship defined between a liquid surface level in the sub-tank 83 and a level in height of each ink ejection surface 522 so that a meniscus surface is formed at each of nozzle holes of ink ejection nozzles 521, through which ink is ejected.

The syringe 84 is arranged on a downstream side of the sub-tank 83 in the ink flow direction and on an upstream side of the recording heads 52 in the ink flow direction. Ink flows into the syringe 84 from the sub-tank 83 and flows out therefrom toward the recording heads 52. As shown in FIG. 5, the syringe 84 includes a cylinder 841 and a plunger 842.

The cylinder 841 has a shape of a circular cylinder arranged so that an axis thereof extends in an up-down direction. The cylinder 841 is open at an upper end thereof. The cylinder 841 is closed at a lower end thereof to which a first conduit 851 of the first flow path 85, which extends from the sub-tank 83, and a second conduit 852 of the first flow path 85, which extends toward the recording heads 52, are connected. The first conduit 851 and the second conduit 852 communicate with an inside of the cylinder 841.

The plunger 842 is inserted into the cylinder 841 from an upper end opening of the cylinder 841. The plunger 842 includes a shaft 842*a* and a gasket 842*b*. The shaft 842*a* is formed so that an axis thereof extends in the up-down direction. The gasket 842*b* is arranged at a lower end of the shaft 842*a*. The gasket 842*b* has a shape of a circular cylinder extending along an inner circumferential surface of the cylinder 841, and an outer circumferential surface thereof is in intimate contact with the inner circumferential surface of the cylinder 841. This prevents ink in the cylinder 841 from leaking to an upper side beyond the gasket 842*b*.

A fourth conduit 891 of the third flow path 89 is inserted through a radial center of the plunger 842. The fourth conduit 891 communicates with the inside of the cylinder 841. Air remaining in the cylinder 841, i.e., above the ink and below the gasket 842*b* in the syringe 84 is discharged upward via the fourth conduit 891.

The third flow path 89 extends from the syringe 84 to the sub-tank 83. The third flow path 89 is an air flow path for discharging the air in the syringe 84 to the sub-tank 83. In other words, the fourth conduit 891 of the third flow path 89 is a conduit for discharging the air in the syringe 84 through a path different from the ink flow path.

The third open/close valve 93 is arranged on the fourth conduit 891 of the third flow path 89. The third open/close valve 93 opens/closes the third flow path 89. The third open/close valve 93 is formed of, for example, a solenoid valve and is controlled to be opened/closed by the control portion 7. The control portion 7 opens the third open/close valve 93 to discharge the air in the syringe 84.

A rack 842*c* is formed on a side surface of the shaft 842*a*. The rack 842*c* has a plurality of teeth arranged in juxtaposition along the up-down direction and is meshed with a syringe drive gear 843. The syringe drive gear 843 is connected to a syringe motor 844 (see FIG. 3) and is rotated in both of forward and reverse directions with power obtained from the syringe motor 844. The syringe drive gear 843 rotates in both of the forward and reverse directions, thus enabling reciprocation of the plunger 842 along the up-down direction. An operation of the syringe motor 844 is controlled by the control portion 7.

During recording of an image on a sheet S, a recording pressure is applied to ink by the action of a hydraulic head pressure. Meanwhile, for example, during maintenance or the like, the control portion 7 controls the syringe motor 844 to move the plunger 842 downward at a high speed so that ink is extruded from inside the syringe 84, and thus a maintenance pressure higher than the recording pressure can be applied to the ink. That is, the syringe 84 is capable of applying, to ink, the maintenance pressure higher than the recording pressure applied during recording on the sheet S.

The first flow path 85, the second flow path 86, and the communication flow path 87 constitute the ink flow path along which ink circulates from and to the sub-tank 83 by passing through the recording heads 52.

The first flow path 85 is a part of the ink flow path along which ink flows from the sub-tank 83 to the recording heads 52 by passing through the syringe 84. The first flow path 85 includes the first conduit 851 extending from the sub-tank 83 to the syringe 84 and the second conduit 852 extending from the syringe 84 to the recording heads 52.

The first open/close valve 91 is arranged on an upstream side with respect to the syringe 84 in the ink flow direction on the first conduit 851 of the first flow path 85. The first conduit 851 is formed of, for example, a tube made of rubber and thus can be deformed by being bent or sagged. As shown in FIG. 6, the first open/close valve 91 includes an open/close cam 91*a* and an open/close motor (not shown).

The open/close cam 91*a* adjoins to the first conduit 851. The open/close cam 91*a* is formed in a wedge shape as viewed from an axis direction of the first conduit 851. The open/close cam 91*a* is supported so as to be rotatable about a rotation axis parallel to an axis of the first conduit 851. The open/close cam 91*a* is rotated to swing by the open/close motor, and thus a tip of the wedge shape contacts or separates from the first conduit 851.

To bring the first open/close valve 91 to an opened state, the control portion 7 controls the open/close motor to rotate the open/close cam 91*a* so that the open/close cam 91*a* is at such an angle as not to contact the first conduit 851 or not to deform the first conduit 851. This allows ink to flow through the first conduit 851 at a location of the first open/close valve 91. To bring the first open/close valve 91 to a closed state, the control portion 7 controls the open/close motor to rotate the open/close cam 91*a* so that the open/close cam 91*a* is at such an angle as to contact the first conduit 851 and to crush the first conduit 851. This stops ink from flowing through the first conduit 851 at the location of the first open/close valve 91. The first open/close valve 91 opens/closes a part of the first flow path 85 extending between the sub-tank 83 and the syringe 84.

The second open/close valve 92 is arranged on the second conduit 852 of the first flow path 85. A configuration and an operation of the second open/close valve 92 are similar to those of the first open/close valve 91 described above, and thus duplicate descriptions thereof are omitted here. The second open/close valve 92 is controlled to be opened/closed by the control portion 7. The second open/close valve 92 opens/closes a part of the first flow path 85 extending between the syringe 84 and the recording heads 52.

The second flow path 86 is a part of the ink flow path along which ink flows from the recording heads 52 to the sub-tank 83. The second flow path 86 includes a third conduit 861 extending from the recording heads 52 to the sub-tank 83.

The communication flow path 87 establishes communication between an upstream side of the recording heads 52 in the ink flow direction on the first flow path 85 and a downstream side of the recording heads 52 in the ink flow direction on the second flow path 86. To be more specific, in a neighborhood of the coupling 11 in the ink supply portion 8, the communication flow path 87 is coupled between the second conduit 852 of the first flow path 85 and the third conduit 861 of the second flow path 86.

The open/close mechanism 88 is arranged on the communication flow path 87. The open/close mechanism 88 is formed of, for example, a solenoid valve and is controlled to be opened/closed by the control portion 7. The open/close mechanism 88 opens/closes the communication flow path 87.

Figure 7:
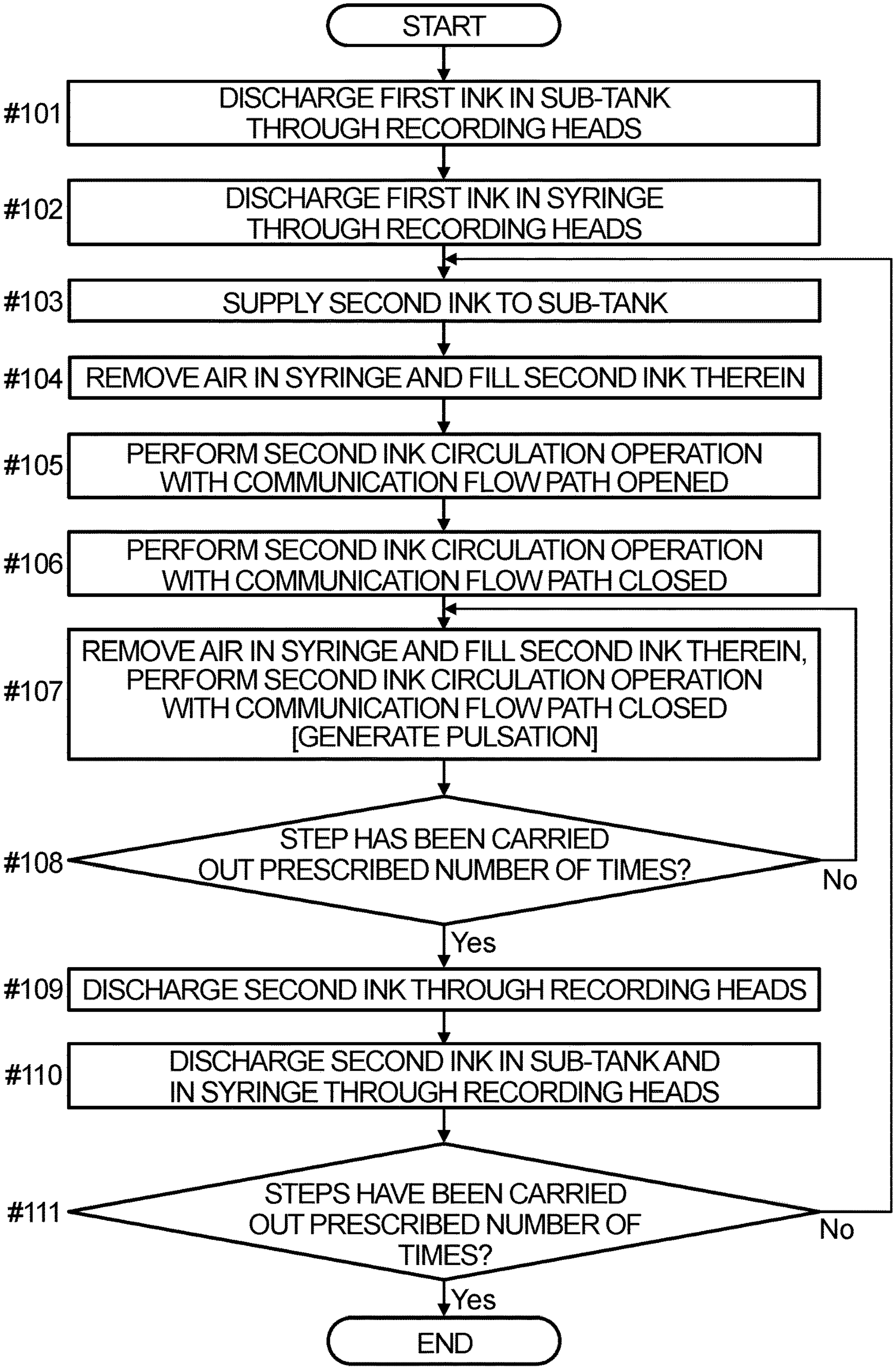
FIG. 7 is a flow chart showing an example of a process for replacement with a different supply of ink in the inkjet recording apparatus shown in FIG. 3.

Next, by following a flow, a description is given of an example of replacement with a different supply of ink. FIG. 7 is a flow chart showing an example of a process for replacement with a different supply of ink in the inkjet recording apparatus 1 shown in FIG. 1. In the following description, ink already present in the ink flow path is referred to as a “first ink,” and ink to be newly supplied to the recording heads 52 to replace the first ink is referred to as a “second ink.”

Upon a start ("START" in FIG. 7) of the process for replacement with a different supply of ink in the inkjet recording apparatus 1, the control portion 7 performs control so that the first ink present in the sub-tank 83 is discharged through the recording heads 52 (step #101). At this time, the control portion 7 controls the syringe motor 844 to cause the syringe 84 to perform an extruding operation so that the first ink is discharged through the recording heads 52. An amount of the ink in the sub-tank 83 is detected by, for example, the ink amount sensor of the sub-tank 83.

Next, the control portion 7 performs control so that the first ink present in the syringe 84 is discharged through the recording heads 52 (step #102). At this time, the control portion 7 controls the syringe motor 844 to cause the syringe 84 to perform the extruding operation so that the first ink is discharged from the syringe 84.

In the above-described manner, the control portion 7 carries out an ink discharge step for discharging the first ink in the sub-tank 83 and in the ink flow path through the recording heads 52.

Next, the control portion 7 performs control so that the second ink is supplied from the ink container 81 to the sub-tank 83 (step #103). At this time, the control portion 7 drives the container pump 82.

Next, the control portion 7 carries out an operation for removing air in the syringe 84 and performs control so that the second ink is filled in the syringe 84 (step #104).

For example, in the operation for removing air in the syringe 84, the control portion 7 controls the open/close motor to close the first open/close valve 91 and the second open/close valve 92 and to open the third open/close valve 93 and further controls the syringe motor 844 to cause the syringe 84 to perform the extruding operation so that the air in the syringe 84 is discharged via the fourth conduit 891 of the third flow path 89. In an operation for filling the second ink in the syringe 84, the control portion 7 controls the open/close motor to open the first open/close valve 91 and the third open/close valve 93 and to close the second open/close valve 92 and further controls the syringe motor 844 to cause the syringe 84 to perform a sucking operation so that the second ink is filled in the syringe 84 from the sub-tank 83.

Next, the control portion 7 controls the open/close mechanism 88 to open the communication flow path 87 and carries out a first circulation operation for circulating the second ink in the ink flow path (step #105). At this time, the control portion 7 controls the syringe motor 844 to cause the syringe 84 to carry out the sucking operation and the extruding operation as appropriate so that the second ink is circulated in the ink flow path.

Next, the control portion 7 controls the open/close mechanism 88 to close the communication flow path 87 and carries out a second circulation operation for circulating the second ink in the ink flow path (step #106). At this time, the control portion 7 controls the syringe motor 844 to cause the syringe 84 to carry out the sucking operation and the extruding operation as appropriate so that the second ink is circulated in the ink flow path.

In the above-described manner, the control portion 7 carries out an ink injection step for causing the second ink to flow from the sub-tank 83 into the ink flow path so that the second ink is injected into the recording heads 52 and circulates.

Next, the control portion 7 carries out the operation for removing air in the syringe 84 and the operation for filling the second ink in the syringe 84 and further carries out the operation for circulating the second ink into the ink flow path with the communication flow path 87 closed (step #107). At this time, the control portion 7 controls the syringe motor 844 to cause the syringe 84 to carry out the sucking operation and the extruding operation several times as appropriate so that pulsation is generated in the second ink in the ink flow path. That is, the control portion 7 carries out a pulsation step for generating pulsation in the second ink in the ink flow path. Further, the control portion 7 carries out this step a prescribed number of times (step #108).

At step #107, there may be carried out only the operation for circulating the second ink into the ink flow path with the communication flow path 87 closed.

Further, the control portion 7 performs control so that the second ink is discharged (purged) through the recording heads 52 (step #109). At this time, the control portion 7 controls the syringe motor 844 to cause the syringe 84 to perform the extruding operation so that the second ink is discharged (purged) through the recording heads 52. Moreover, at this time, the second ink may be discharged while the syringe 84 generates pulsation in the second ink in the ink flow path.

Next, the control portion 7 performs control so that the second ink present in the sub-tank 83 and in the syringe 84 is discharged through the recording heads 52 (step #110). At this time, the control portion 7 controls the syringe motor 844 to cause the syringe 84 to perform the extruding operation so that the second ink is discharged through the recording heads 52.

Further, the control portion 7 carries out the processes of step #103 to step #110 a prescribed number of times (step #111). At this time, at a point in time when step #109 is ended for the last time, the process for replacing the first ink with the second ink is regarded as completed.

As described above, in an ink-replacement method for the inkjet recording apparatus 1, in replacing the first ink present in the ink flow path with the second ink to be newly supplied to the recording heads 52 via the ink flow path, when the second ink is caused to flow from the sub-tank 83 into the ink flow path, pulsation is generated in the ink flow path. According to this configuration, in a case of replacing the first ink with the second ink, pulsation is generated in the ink flow path, and thus ink mixability can be improved. Accordingly, in a case of replacement with a different supply of ink in the inkjet recording apparatus 1, it becomes possible to achieve reductions in amount of ink consumed and amount of time required.

Furthermore, the above-described ink-replacement method for the inkjet recording apparatus 1 includes the ink discharge step for discharging the first ink, the ink injection step for injecting the second ink, and the pulsation step for generating pulsation in the second ink. According to this configuration, pulsation can be generated in the second ink newly injected into the ink flow path after the first ink has been discharged from inside the ink flow path.

Furthermore, in the above-described ink-replacement method, the syringe 84 is used to suck the first ink and the second ink from the sub-tank 83 and to extrude them toward the recording heads 52. According to this configuration, during recording of an image on the sheet S, in the inkjet recording apparatus 1 not configured to circulate ink by use of a pump or the like, the first ink and the second ink can be moved in the ink flow path.

Furthermore, in the ink injection step, there are carried out the first circulation operation for circulating the second ink with the communication flow path 87 opened and the second circulation operation for circulating the second ink with the communication flow path 87 closed. According to this configuration, it is possible to efficiently achieve injection of the second ink in each of the ink flow path with the communication flow path 87 opened and the ink flow path with the communication flow path 87 closed. Accordingly, ink-replacement efficiency can be improved, and thus it becomes possible to more effectively achieve reductions in amount of ink consumed and amount of time required for replacement.

Furthermore, at least one of a speed of ink pulsation, the number of times of generation thereof, and a cycle thereof is variable. For example, the speed of ink pulsation, the number of times of generation thereof, and the cycle thereof may be varied as appropriate in accordance with a configuration of the ink flow path or the like. Furthermore, the speed of ink pulsation, the number of times of generation thereof, and the cycle thereof may be varied in stages. For example, in an initial stage of pulsation, by decreasing the speed and increasing a length of the cycle, it is possible to facilitate discharge of large air bubbles in the ink flow path. Moreover, after that, by increasing the speed of pulsation and decreasing the length of the cycle thereof, it is possible to facilitate discharge of small air bubbles in the ink flow path. Accordingly, the ink-replacement efficiency can be further improved.

Furthermore, in the inkjet recording apparatus 1 employing a system in which, as in the above-described configuration, a hydraulic head pressure is utilized to form a meniscus surface at each of the nozzle holes of the recording heads 52, in a case of replacement with a different supply of ink, ink mixability can be improved, and thus it becomes possible to achieve reductions in amount of ink consumed and amount of time required for the replacement.

Second Embodiment

Figure 8:
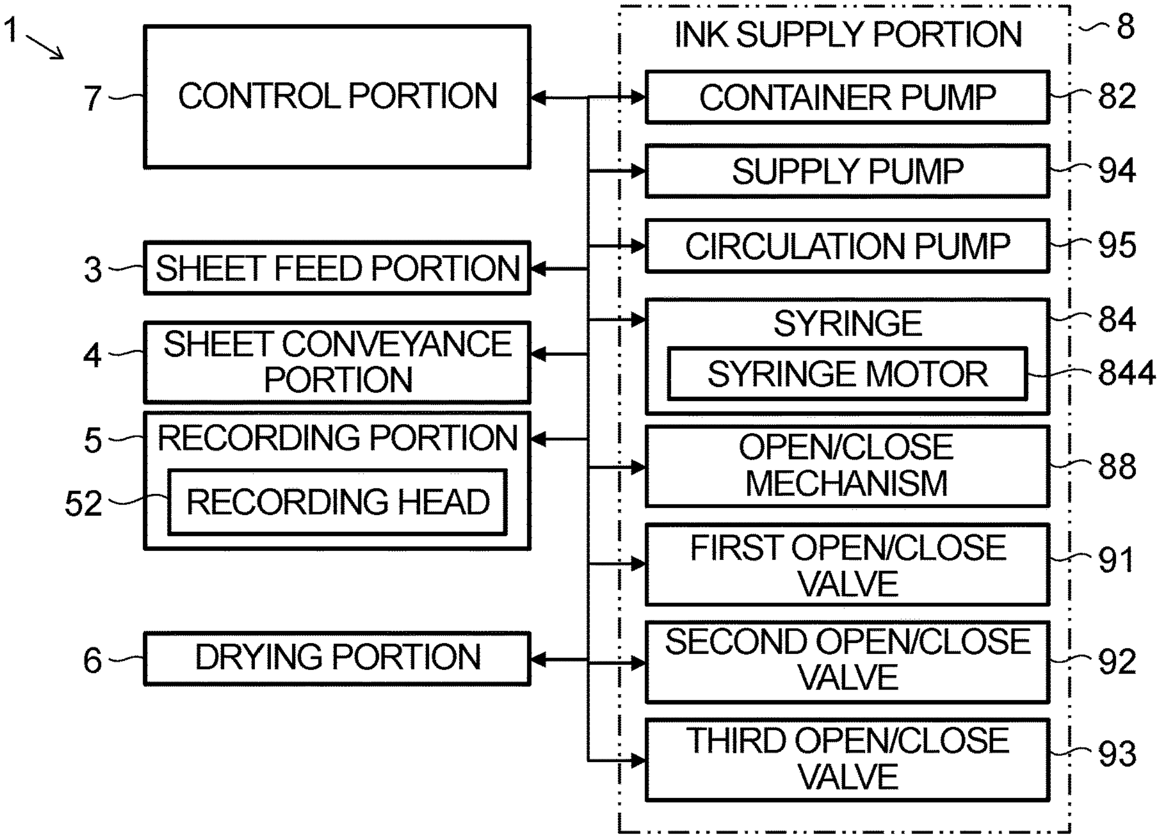
FIG. 8 is a block diagram of an inkjet recording apparatus according to a second embodiment of the present disclosure.
Figure 9:
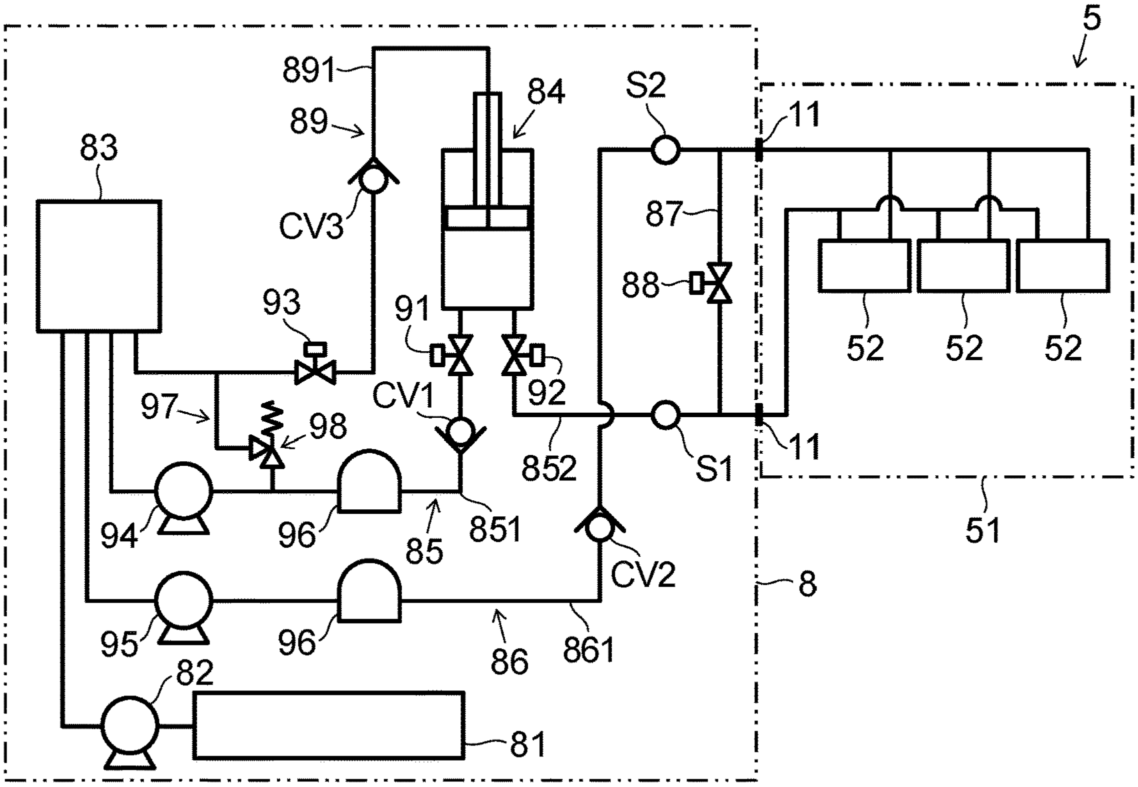
FIG. 9 is an explanatory view of a vicinity of an ink supply portion in the inkjet recording apparatus shown in FIG. 8.
Figure 10:
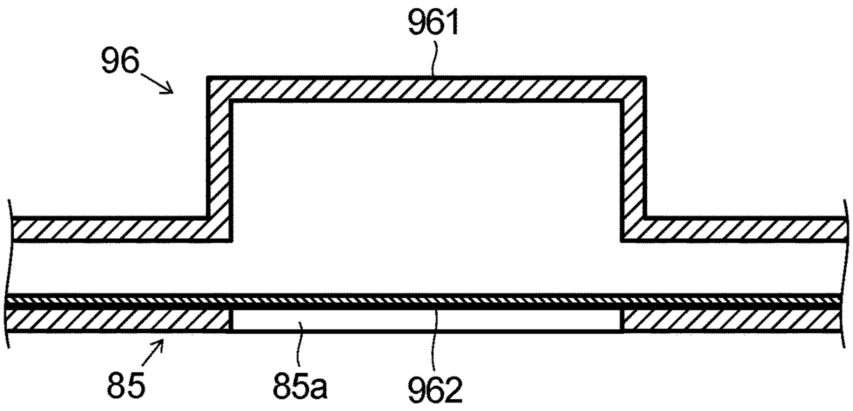
FIG. 10 is a sectional view of a damper in the ink supply portion shown in FIG. 9.

Next, with reference to FIG. 8, FIG. 9, and FIG. 10, a description is given of a configuration of an ink supply portion 8 of an inkjet recording apparatus 1 according to a second embodiment. FIG. 8 is a block diagram of the inkjet recording apparatus 1 according to the second embodiment of the present disclosure. FIG. 9 is an explanatory view of a vicinity of the ink supply portion 8 in the inkjet recording apparatus 1 shown in FIG. 8. FIG. 10 is a sectional view of a damper 96 in the ink supply portion 8 shown in FIG. 9. Since a basic configuration of the second embodiment is identical to that of the first embodiment described earlier, constituent elements in common are denoted by identical reference characters or identical names to those used previously, and duplicate descriptions thereof may be omitted.

The inkjet recording apparatus 1 according to the second embodiment includes the ink supply portion 8. The ink supply portion 8 includes an ink container 81, a container pump 82, a sub-tank 83, a supply pump 94, a circulation pump 95, the damper 96, a syringe 84, a first flow path 85, a second flow path 86, a communication flow path 87, and an open/close mechanism 88. The ink supply portion 8 further includes a third flow path 89, a first open/close valve 91, a second open/close valve 92, a third open/close valve 93, a fifth flow path 97, and a relief valve 98.

The supply pump 94 is arranged on a downstream side of the sub-tank 83 in an ink flow direction on the first flow path 85. The supply pump 94 supplies ink from the sub-tank 83 to recording heads 52. As the supply pump 94, for example, a pump selected from among liquid pumps including a tube pump, a diaphragm pump, and so on can be used. An operation of the supply pump 94 is controlled by a control portion 7.

The circulation pump 95 is arranged on a downstream side of the recording heads 52 in the ink flow direction on the second flow path 86. The circulation pump 95 circulates ink from the recording heads 52 to the sub-tank 83. As the circulation pump 95, for example, a pump selected from among the liquid pumps including the tube pump, the diaphragm pump, and so on can be used. An operation of the circulation pump 95 is controlled by the control portion 7.

Pressure sensors S1 and S2 for detecting a pressure applied to ink being supplied to the recording heads 52, for detecting a pressure applied to ink being circulated are provided on the first flow path 85 and the second flow path 86, respectively. The pressure sensor S1 is arranged on an upstream side of the recording heads 52 in the ink flow direction on the first flow path 85. The pressure sensor S2 is arranged on a downstream side of the recording heads 52 in the ink flow direction on the second flow path 86. Based on a detection signal from each of the pressure sensors S1 and S2, the control portion 7 controls the operation of a corresponding one of the supply pump 94 and the circulation pump 95 in an analog manner in real time.

Furthermore, check valves CV1, CV2, and CV3 are arranged on a first conduit 851 of the first flow path 85, a third conduit 861 of the second flow path 86, and a fourth conduit 891 of the third flow path 89, respectively. The check valves CV1 and CV2 prevent a backflow of ink from a downstream side to an upstream side in the ink flow direction on the first flow path 85 and on the second flow path 86, respectively. The check valve CV3 prevents a backflow of air from a downstream side to an upstream side in an air flow direction on the third flow path 89.

The damper 96 is arranged between the supply pump 94 and the syringe 84 on the first flow path 85 and between the recording heads 52 and the circulation pump 95 on the second flow path 86. To be more specific, a first damper 96 is arranged, on the first conduit 851 of the first flow path 85, on a downstream side with respect to the supply pump 94 in the ink flow direction and on an upstream side with respect to the check valve CV1 in the ink flow direction. Furthermore, to be more specific, a second damper 96 is arranged, on the third conduit 861 of the second flow path 86, on a downstream side with respect to the check valve CV2 in the ink flow direction and on an upstream side with respect to the circulation pump 95 in the ink flow direction.

For example, as shown in FIG. 10, the first damper 96 on the first flow path 85 includes a damper chamber 961 and a film 962. The damper chamber 961 has a cavity that is, for example, convex upward from the first flow path 85 along which ink flows in a horizontal direction. The first flow path 85 is open at a part of a lower wall thereof opposed to the damper chamber 961 in an up-down direction. The film 962 is arranged at the part of the lower wall of the first flow path 85 so as to cover an opening 85*a* of the first flow path 85. The film 962 has flexibility and is elastically deformable. The film 962 becomes deformed in accordance with a variation in pressure applied to ink in the damper chamber 961, thus causing a change in volumetric capacity of the damper chamber 961. The second damper 96 on the second flow path 86 has an identical configuration thereto.

The dampers 96 reduce a variation in pressure applied to ink in the first flow path 85 and in the second flow path 86, respectively. This can suppress a load on the recording heads 52 caused by ink pulsation. It is desirable to adopt a configuration utilizing an elastic member such as a spring to follow an amplitude cycle of the pumps.

The fifth flow path 97 couples a downstream side with respect to the supply pump 94 in the ink flow direction on the first flow path 85 to a downstream side with respect to the third open/close valve 93 in the air flow direction on the third flow path 89.

The relief valve 98 is arranged on the fifth flow path 97. The relief valve 98 is opened when a flow path internal pressure on a side near the first flow path 85 has reached a prescribed pressure value. This can prevent a phenomenon in which an excessive pressure is applied to the conduits at the occurrence of an abnormality in the ink flow path. Further, it is possible to prevent ink from leaking into the apparatus.

Next, by following a flow, a description is given of an example of replacement with a different supply of ink. A process for replacement with a different supply of ink in the inkjet recording apparatus 1 according to the second embodiment is also identical in basic process flow to the process shown in FIG. 7 and described in the first embodiment. Accordingly, with reference to FIG. 7, only differences from the previously described process are described herein.

In carrying out the pulsation step at step #107 in FIG. 7, the inkjet recording apparatus 1 according to the second embodiment causes the supply pump 94 and the circulation pump 95 to generate pulsation in a second ink in the ink flow path. At this time, the control portion 7 controls on/off of driving of the supply pump 94 and the circulation pump 95 or a speed for driving them so that pulsation is generated in the second ink in the ink flow path.

Further, at least one of a speed of ink pulsation, the number of times of generation thereof, and a cycle thereof is variable. For example, the speed of ink pulsation, the number of times of generation thereof, and the cycle thereof may be varied as appropriate in accordance with a configuration of the ink flow path or the like. Furthermore, the speed of ink pulsation, the number of times of generation thereof, and the cycle thereof may be varied in stages. Furthermore, concurrently therewith, the syringe 84 may carry out generation of pulsation.

According to the above-described configuration, the inkjet recording apparatus 1 includes the supply pump 94, the circulation pump 95, and the damper 96 and causes the supply pump 94 and the circulation pump 95 to generate pulsation in the second ink in the ink flow path. Further, in the inkjet recording apparatus 1 employing this ink circulation system, in a case of replacement with a different supply of ink, ink mixability can be improved, and thus it becomes possible to achieve reductions in amount of ink consumed and amount of time required for the replacement.

Third Embodiment

Figure 11:
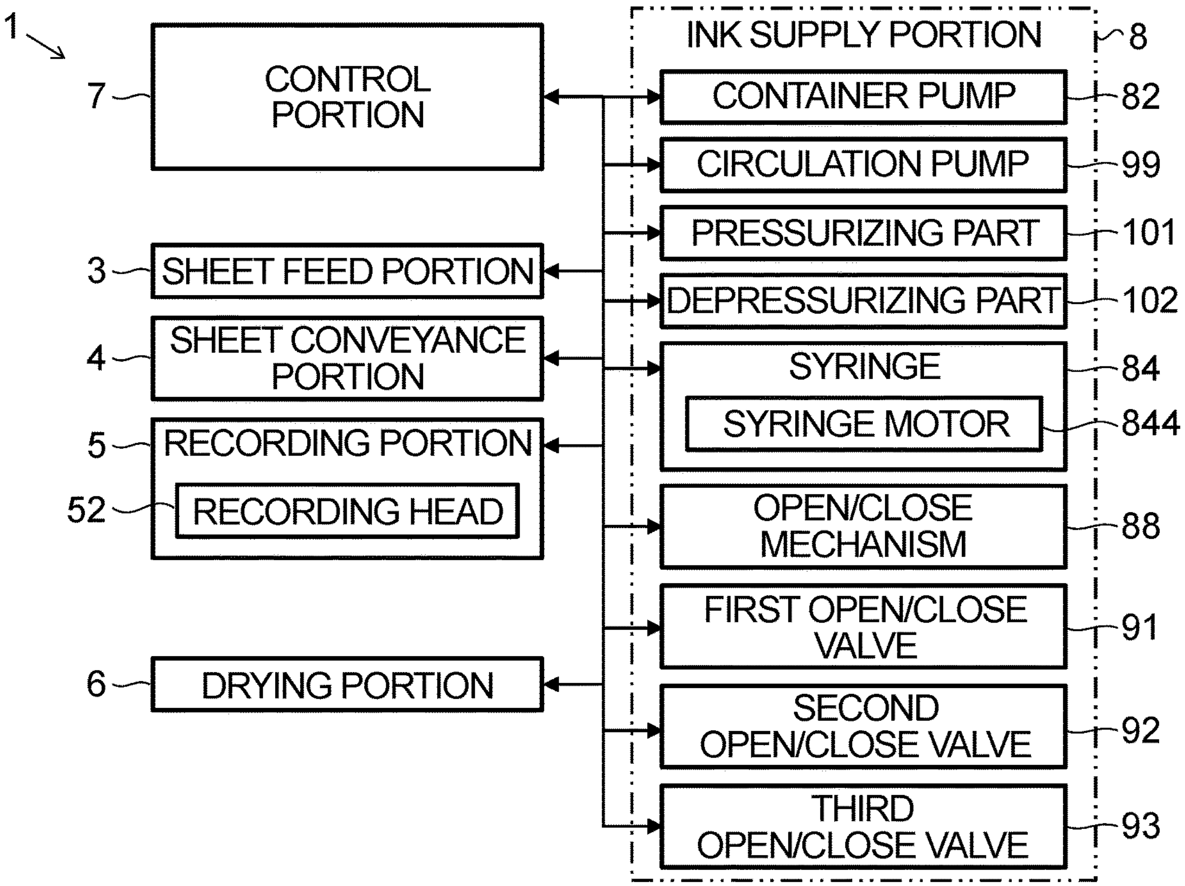
FIG. 11 is a block diagram of an inkjet recording apparatus according to a third embodiment of the present disclosure.
Figure 12:
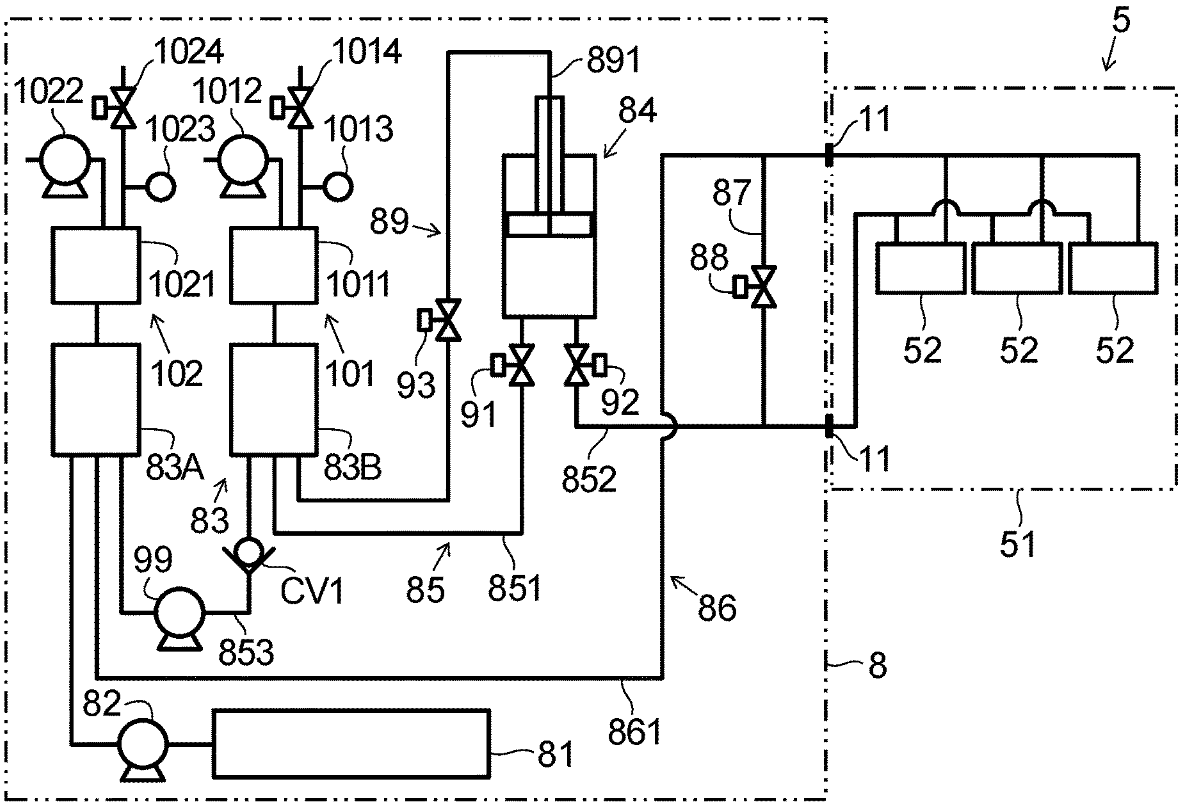
FIG. 12 is an explanatory view of a vicinity of an ink supply portion in the inkjet recording apparatus shown in FIG. 11.

Next, with reference to FIG. 11 and FIG. 12, a description is given of a configuration of an ink supply portion 8 of an inkjet recording apparatus 1 according to a third embodiment. FIG. 11 is a block diagram of the inkjet recording apparatus 1 according to the third embodiment of the present disclosure. FIG. 12 is an explanatory view of a vicinity of the ink supply portion 8 in the inkjet recording apparatus 1 shown in FIG. 11. Since a basic configuration of the third embodiment is identical to that of the first embodiment described earlier, constituent elements in common are denoted by identical reference characters or identical names to those used previously, and duplicate descriptions thereof may be omitted.

The inkjet recording apparatus 1 according to the third embodiment includes the ink supply portion 8. The ink supply portion 8 includes an ink container 81, a container pump 82, a sub-tank 83, a circulation pump 99, a pressurizing part 101, a depressurizing part 102, a syringe 84, a first flow path 85, a second flow path 86, a communication flow path 87, and an open/close mechanism 88. The sub-tank 83 includes a first sub-tank 83A and a second sub-tank 83B.

The first sub-tank 83A is arranged on a downstream side of the container pump 82 in an ink flow direction. The first sub-tank 83A temporarily retains ink supplied from the ink container 81. Based on a detection signal from an ink amount sensor (not shown) provided in the first sub-tank 83A, a control portion 7 controls the container pump 82 to supply ink from the ink container 81 to the first sub-tank 83A.

The circulation pump 99 is arranged on a downstream side of the first sub-tank 83A in the ink flow direction. The circulation pump 99 moves ink from the first sub-tank 83A to the second sub-tank 83B. An operation of the circulation pump 99 is controlled by the control portion 7.

The second sub-tank 83B is arranged on a downstream side of the circulation pump 99 in the ink flow direction. The second sub-tank 83B temporarily retains ink supplied from the first sub-tank 83A. Similarly to a case of the first sub-tank 83A, based on a detection signal from an ink amount sensor (not shown) provided in the second sub-tank 83B, the control portion 7 controls the circulation pump 99 to move ink from the first sub-tank 83A to the second sub-tank 83B.

The pressurizing part 101 is provided as an annex to the second sub-tank 83B. The pressurizing part 101 pressurizes an inside of the second sub-tank 83B so as to supply ink from the second sub-tank 83B to recording heads 52. An operation of the pressurizing part 101 is controlled by the control portion 7.

The pressurizing part 101 includes a pressurizing chamber 1011, a pressurizing pump 1012, a pressurizing sensor 1013, and a pressurizing chamber open/close mechanism 1014. The pressurizing chamber 1011 has a prescribed volumetric capacity and communicates with the second sub-tank 83B. The pressurizing pump 1012 causes air to flow into the pressurizing chamber 1011 so as to pressurize the pressurizing chamber 1011. The pressurizing sensor 1013 detects a pressure in the pressurizing chamber 1011. The pressurizing chamber open/close mechanism 1014 opens/closes an air flow path between an inside of the pressurizing chamber 1011 and the atmosphere.

Based on a detection signal from the pressurizing sensor 1013, the control portion 7 controls operations of the pressurizing pump 1012 and the pressurizing chamber open/close mechanism 1014 in an analog manner in real time. According to this configuration, it is possible to favorably pressurize the inside of the second sub-tank 83B and thus to efficiently supply ink from the second sub-tank 83B to the recording heads 52.

The depressurizing part 102 is provided as an annex to the first sub-tank 83A. The depressurizing part 102 depressurizes an inside of the first sub-tank 83A so as to circulate ink from the recording heads 52 to the first sub-tank 83A. An operation of the depressurizing part 102 is controlled by the control portion 7.

The depressurizing part 102 includes a depressurizing chamber 1021, a depressurizing pump 1022, a depressurizing sensor 1023, and a depressurizing chamber open/close mechanism 1024. The depressurizing chamber 1021 has a prescribed volumetric capacity and communicates with the first sub-tank 83A. The depressurizing pump 1022 causes air to flow out from inside the depressurizing chamber 1021 so as to depressurize the depressurizing chamber 1021. The depressurizing sensor 1023 detects a pressure in the depressurizing chamber 1021. The depressurizing chamber open/close mechanism 1024 opens/closes an air flow path between an inside of the depressurizing chamber 1021 and the atmosphere.

Based on a detection signal from the depressurizing sensor 1023, the control portion 7 controls operations of the depressurizing pump 1022 and the depressurizing chamber open/close mechanism 1024 in an analog manner in real time. According to this configuration, it is possible to favorably depressurize the inside of the first sub-tank 83A and thus to efficiently circulate ink from the recording heads 52 to the first sub-tank 83A.

The pressurizing part 101 and the depressurizing part 102 are not limited to their respective configurations described above. As the pressurizing part 101 and the depressurizing part 102, for example, regulators or a negative pressure generator and a pressurizing pump may be used.

Furthermore, the first flow path 85 is a part of an ink flow path along which ink flows from the first sub-tank 83A to the recording heads 52 by passing through the circulation pump 99, the second sub-tank 83B, and the syringe 84. The first flow path 85 includes a first conduit 851 extending from the second sub-tank 83B to the syringe 84, a second conduit 852 extending from the syringe 84 to the recording heads 52, and a circulation conduit 853 extending from the first sub-tank 83A to the second sub-tank 83B. A check valve CV1 is arranged on the circulation conduit 853. The check valve CV1 prevents a backflow of ink from a downstream side to an upstream side in the ink flow direction on the first flow path 85.

Next, by following a flow, a description is given of an example of replacement with a different supply of ink. A process for replacement with a different supply of ink in the inkjet recording apparatus 1 according to the third embodiment is also identical in basic process flow to the process shown in FIG. 7 and described in the first embodiment. Accordingly, with reference to FIG. 7, only differences from the previously described process are described herein.

In carrying out the pulsation step at step #107 in FIG. 7, the inkjet recording apparatus 1 according to the third embodiment causes the circulation pump 99, the pressurizing part 101, and the depressurizing part 102 to generate pulsation in a second ink in the ink flow path. At this time, the control portion 7 controls on/off of driving of the circulation pump 99, the pressurizing part 101, and the depressurizing part 102 or a speed for driving them so that pulsation is generated in the second ink in the ink flow path.

Further, at least one of a speed of ink pulsation, the number of times of generation thereof, and a cycle thereof is variable. For example, the speed of ink pulsation, the number of times of generation thereof, and the cycle thereof may be varied as appropriate in accordance with a configuration of the ink flow path or the like. The speed and cycle of the pulsation may be varied using a magnitude of a difference between an internal pressure in the first sub-tank 83A and an internal pressure in the second sub-tank 83B, timing of opening to the atmosphere, or regulator control. Furthermore, the speed of ink pulsation, the number of times of generation thereof, and the cycle thereof may be varied in stages. Furthermore, concurrently therewith, the syringe 84 may carry out generation of pulsation.

According to the above-described configuration, the inkjet recording apparatus 1 includes the first sub-tank 83A, the second sub-tank 83B, the circulation pump 99, the pressurizing part 101, and the depressurizing part 102 and causes the circulation pump 99, the pressurizing part 101, and the depressurizing part 102 to generate pulsation in the second ink in the ink flow path. Further, in the inkjet recording apparatus 1 employing this ink circulation system, in a case of replacement with a different supply of ink, ink mixability can be improved, and thus it becomes possible to achieve reductions in amount of ink consumed and amount of time required for the replacement.

While the foregoing has described the embodiments of the present disclosure, a scope of the present disclosure is not limited thereto, and the present disclosure can be implemented by adding various modifications thereto without departing from the spirit of the disclosure.

For example, while the foregoing embodiments have described the ink-replacement method for replacing the first ink present in the ink flow path with the second ink to be newly supplied to the recording heads, a liquid such as a cleaning solution is also applicable in place of ink. In a case where a cleaning solution is injected to replace the first ink and to be replaced with the second ink, an ink-replacement method similar to that in the foregoing embodiments is carried out to replace the first ink with the cleaning solution and to replace the cleaning solution with the second ink.

What is claimed is:

1. An ink-replacement method for an inkjet recording apparatus comprising:

a recording head having an ink ejection surface on which a plurality of nozzles for ejecting ink onto a recording medium is arranged;

a sub-tank for temporarily retaining the ink supplied from an ink container; and an ink flow path along which the ink circulates from and to the sub-tank by passing through the recording head, wherein in replacing a first ink present in the ink flow path with a second ink to be newly supplied to the recording head via the ink flow path, when the second ink is caused to flow from the sub-tank into the ink flow path, pulsation is generated in the ink flow path, the ink-replacement method comprises:

an ink discharge step for discharging the first ink in the sub-tank and in the ink flow path through the recording head;

an ink injection step for causing the second ink to flow from the sub-tank into the ink flow path so that the second ink is injected into the recording head and circulates; and a pulsation step for generating pulsation in the second ink in the ink flow path, the inkjet recording apparatus further comprising:

a syringe that is arranged on a downstream side of the sub-tank and on an upstream side of the recording head in an ink flow direction on the ink flow path, the syringe sucks either one of the first ink and the second ink from the sub-tank and extrudes the either one of the first ink and the second ink toward the recording head, the inkjet recording apparatus further comprising:

a communication flow path that couples an upstream side of the recording head to a downstream side of the recording head in the ink flow direction on the ink flow path; and an open/close mechanism that opens/closes the communication flow path, and in the ink injection step, there are carried out:

a first circulation operation for circulating the second ink with the communication flow path opened; and a second circulation operation for circulating the second ink with the communication flow path closed.

2. The ink-replacement method according to claim 1, wherein at least one of a speed of pulsation in the ink, a number of times of generation thereof, and a cycle thereof is variable.

3. The ink-replacement method according to claim 1, wherein the sub-tank and the recording head are arranged with a positional relationship defined between a liquid surface level in the sub-tank and a level in height of the ink ejection surface so that a meniscus surface is formed at each of nozzle holes of the nozzles, through which the ink is ejected, and pulsation is generated in the ink flow path by the syringe.

4. An ink-replacement method for an inkjet recording apparatus comprising:

a recording head having an ink ejection surface on which a plurality of nozzles for ejecting ink onto a recording medium is arranged;

a sub-tank for temporarily retaining the ink supplied from an ink container; and an ink flow path along which the ink circulates from and to the sub-tank by passing through the recording head, wherein in replacing a first ink present in the ink flow path with a second ink to be newly supplied to the recording head via the ink flow path, when the second ink is caused to flow from the sub-tank into the ink flow path, pulsation is generated in the ink flow path, the inkjet recording apparatus further comprising:

a supply pump that is arranged on the ink flow path and supplies the ink from the sub-tank to the recording head;

a circulation pump that is arranged on the ink flow path and circulates the ink from the recording head to the sub-tank; and a damper that is arranged between the supply pump and a syringe on the ink flow path and between the recording head and the circulation pump on the ink flow path and reduces a variation in pressure applied to the ink in the ink flow path, and pulsation is generated in the ink flow path by the supply pump and the circulation pump.

5. An ink-replacement method for an inkjet recording apparatus comprising;

a recording head having an ink ejection surface on which a plurality of nozzles for ejecting ink onto a recording medium is arranged;

a sub-tank for temporarily retaining the ink supplied from an ink container; and an ink flow path along which the ink circulates from and to the sub-tank by passing through the recording head, wherein in replacing a first ink present in the ink flow path with a second ink to be newly supplied to the recording head via the ink flow path, when the second ink is caused to flow from the sub-tank into the ink flow path, pulsation is generated in the ink flow path, the sub-tank includes:

a first sub-tank for temporarily retaining the ink supplied from the ink container; and a second sub-tank for temporarily retaining the ink supplied from the first sub-tank, the inkjet recording apparatus further comprises:

a circulation pump that is arranged on the ink flow path and moves the ink from the first sub-tank to the second sub-tank;

a pressurizing part that pressurizes an inside of the second sub-tank so as to supply the ink from the second sub-tank to the recording head; and a depressurizing part that depressurizes an inside of the first sub-tank so as to circulate the ink from the recording head to the first sub-tank, and pulsation is generated in the ink flow path by the circulation pump, the pressurizing part, and the depressurizing part.

* * * * *